United States Patent [19]
Kurita et al.

[11] Patent Number: 5,120,423
[45] Date of Patent: Jun. 9, 1992

[54] METHOD FOR THE FORMATION OF AN ELECTROLYTE LAYER OF SOLID ELECTROLYTIC CAPACITORS

[75] Inventors: Junichi Kurita, Yawata; Tsutomu Irikura, Joyo, both of Japan

[73] Assignee: Matsushita Electric Industrial Co., Ltd., Osaka, Japan

[21] Appl. No.: 495,529

[22] Filed: Mar. 19, 1990

[30] Foreign Application Priority Data

Mar. 22, 1989 [JP] Japan ................................ 1-69616
Jun. 30, 1989 [JP] Japan ............................... 1-170171
Jul. 14, 1989 [JP] Japan ............................... 1-182931
Sep. 8, 1989 [JP] Japan ............................... 1-233212

[51] Int. Cl.[5] .......................... C25D 9/06; H01G 9/24
[52] U.S. Cl. .................................. 205/200; 205/201; 205/224; 205/917; 29/25.03; 427/27; 427/80
[58] Field of Search .................... 427/80, 27; 29/25.03; 118/DIG. 5; 205/200, 201, 224, 917

[56] References Cited

U.S. PATENT DOCUMENTS 3,336,903  8/1967  Point ....................... 118/DIG. 5 X
3,473,092  10/1969  Silgaitis ........................... 317/230
3,670,699  6/1972  Sargent ..................... 118/DIG. 5 X
3,950,842  4/1976  Fournier et al. ..................... 29/570

FOREIGN PATENT DOCUMENTS

1298578  6/1962  France .

Primary Examiner—Evan Lawrence
Attorney, Agent, or Firm—Panitch, Schwarze, Jacobs & Nadel

[57] ABSTRACT

A method for the formation of an electrolyte layer of solid electrolytic capacitors is provided. The method comprises: (1) forming an oxide film with dielectric properties on the surface of a porous electrode made of a valve metal, the electrode being electrically connected to an anode lead made of a valve metal, (2) impregnating the electrode, on which the oxide film has been formed, with a solution of manganese nitrate, (3) electrostatically depositing electrolyte powder particles on the surface of the electrode which has been impregnated with the solution, and (4) pyrolyzing the manganese nitrate to manganese dioxide to form an electrolyte layer on the surface of the oxide film.

12 Claims, 4 Drawing Sheets

METHOD FOR THE FORMATION OF AN ELECTROLYTE LAYER OF SOLID ELECTROLYTIC CAPACITORS

BACKGROUND OF THE INVENTION

1. Field of the invention:

The present invention relates to a method for the formation of an electrolyte layer of solid electrolytic capacitors which employ a valve metal as an anode.

Figure 4:
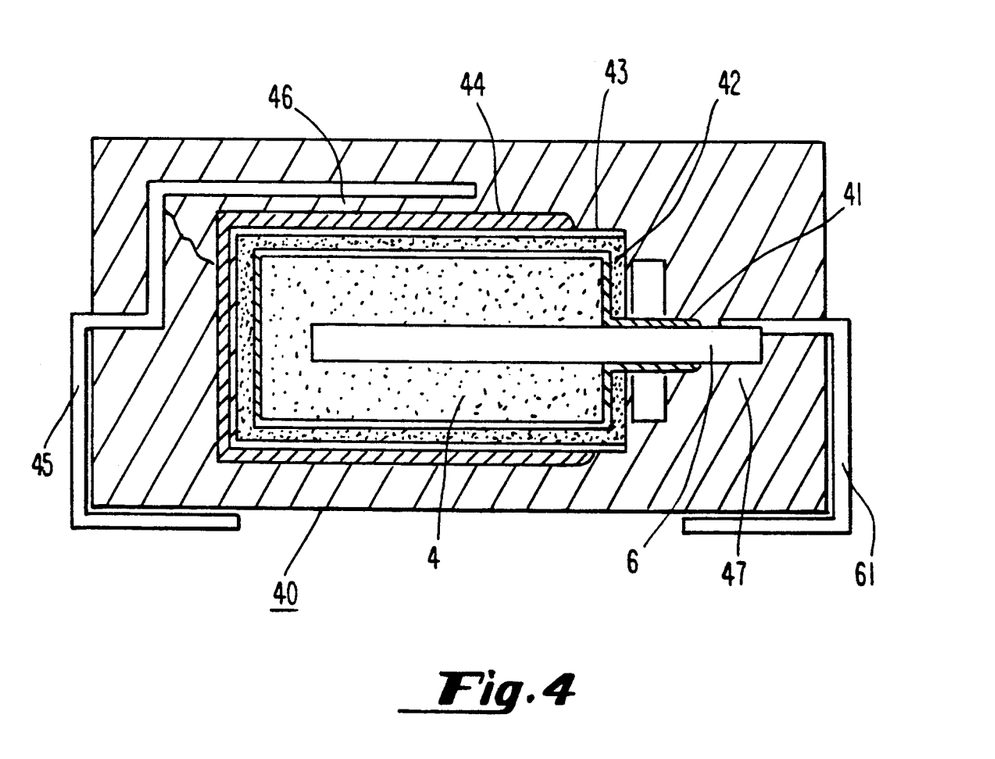
FIG. 4 is a longitudinal sectional view showing the structure of a solid electrolytic capacitor.

2. Description of the prior art:

Solid electrolytic capacitors ordinarily possess the structure shown in FIG. 4. This solid electrolytic capacitor 40 is composed of an electrode 4 provided with an anode lead 6; a dielectric oxide film 41, a solid electrolyte layer 42, a carbon layer 43, and a cathode layer 44, which are successively formed on the surface of the electrode 4; a positive terminal 61 connected to the anode lead 6; and a negative terminal 45 connected to the cathode layer 44 by means of an electrically conductive adhesive 46.

In the production of the capacitor, the electrolyte layer 42 is formed on the surface of the oxide film 41 that had been formed by anodic oxidation of the surface of the electrode 4. In more detail, the electrolyte layer 42 is ordinarily formed by one of the following methods.

In the first method, a porous electrode made of a valve metal on which an oxide film 41 had been formed is initially impregnated with a dilute manganese nitrate solution, followed by the pyrolysis at an appropriate temperature, and repeating this procedure several times. By this operation, the manganese nitrate is oxidized into manganese dioxide, which fills the voids of the porous electrode. Next, this electrode is impregnated with a concentrated manganese nitrate solution of high specific gravity, and pyrolysis is performed at an appropriate temperature. This procedure is also repeated several times, thereby forming an electrolyte layer of manganese dioxide on the surface of the electrode.

In the second method, first the voids of a porous electrode with oxide film are filled with manganese dioxide by impregnation of a dilute manganese nitrate solution, as in the first process described above. Then, the electrode is immersed in a slurry prepared by dispersing manganese dioxide powder in a manganese nitrate solution, lifted out from the slurry, heated at an appropriate temperature. This procedure is repeated several times, resulting in the formation of a manganese dioxide electrolyte layer on the surface of the electrode.

In the third method, first, the voids of a porous electrode are filled with manganese dioxide in the same manner as described above. Then this electrode is immersed in a manganese nitrate solution of appropriate concentration, and after lifting the electrode out of the solution, sprinkling manganese dioxide powder onto the surface of the electrode. Then, this electrode is heated to pyrolyze the manganese nitrate. As a result, the manganese dioxide powder adheres to the electrode by means of the manganese dioxide produced by the pyrolysis, thereby forming the desired electrolyte layer of manganese dioxide.

However, these conventional methods involve the following problems. Concerning the first method, the process of immersing the electrode in a manganese nitrate solution followed by pyrolysis of the manganese nitrate must be repeated many times in order to obtain a manganese dioxide electrolyte layer of the desired thickness, which entails high production costs. The formation of a manganese dioxide electrolyte layer with the desired thickness by fewer repetitions of the said process would require a concentrated manganese nitrate solution of higher specific gravity. However, such highly concentrated solutions of manganese nitrate are extremely hygroscopic, which entails considerable difficulties in adjustment of concentration and storage.

As regards the second method, this method has the advantage of decreasing the number of repetitions of the manganese nitrate pyrolysis routine. However, the manganese dioxide in the slurry is difficult to maintain in a uniform state of dispersion over a long period of time, moreover, the adjustment of the constituents of the slurry and storage of the slurry are also difficult. If a uniform slurry is not obtained, the uniform distribution of the manganese dioxide powder over the electrode surface is difficult, and therefore the electrolyte layer so obtained tends to be nonuniform.

With regard to the third method, the application of the manganese dioxide powder at a uniform thickness by sprinkling is difficult, and in particular, portions of the electrode without adhering powder may occur in the shadow of the powder jet from the sprinkling nozzle.

SUMMARY OF THE INVENTION

The method for the formation of an electrolyte layer of solid electrolytic capacitors of this invention, which overcomes the above-discussed and numerous other disadvantages and deficiencies of the prior art, comprises (1) a step for the formation of an oxide film with dielectric properties on the surface of a porous electrode made of a valve metal, said electrode being electrically connected to an anode lead made of a valve metal, (2) a step for the impregnation of said electrode, on which said oxide film has been formed, with a solution of manganese nitrate, (3) a step for the electrostatic deposition of electrolyte powder particles on the surface of said electrode which has been impregnated with said solution, and (4) a step for the pyrolysis of said manganese nitrate to form an electrolyte layer on the surface of said oxide film.

In a preferred embodiment, the electrolyte powder is at least one selected from the group consisting of manganese dioxide powder, manganese hydroxide powder, lead monoxide powder, and lead dioxide powder.

In a preferred embodiment, a step for impregnating said electrode with a manganese nitrate solution followed by the pyrolysis of said manganese nitrate is repeated at least once between the steps 1 and 2 mentioned above, whereby the voids of the porous electrode are filled with manganese dioxide.

In a preferred embodiment, a step for impregnating said electrode with a manganese nitrate solution followed by the pyrolysis of said manganese nitrate is repeated at least once after step 4 mentioned above.

In a preferred embodiment, step 3 mentioned above is performed by placing said electrode in an atmosphere in which said electrolyte powder is being dispersed.

In a preferred embodiment, the electrolyte powder is dispersed by injecting air from below a porous plate on which said electrolyte powder is placed into a space above said plate.

In a preferred embodiment, the electrolyte powder is electrostatically charged.

In a preferred embodiment, the electrolyte powder is charged by electrostatic charging electrodes, the tips of which are located above, within or below said porous plate.

In a preferred embodiment, a step for the heating of said electrode at a temperature in the range of 120° C. to 180° C. is performed between the steps 2 and 3 mentioned above, so that at least a portion of said manganese nitrate is pyrolyzed, and said manganese nitrate solution is converted into a viscous semisolidified material.

In a preferred embodiment, a step for allowing said electrode to stand at least 10 seconds at room temperature is performed between the said heating step and the step 3 mentioned above, so that the moisture of air is absorbed by said semisolidified manganese nitrate solution, causing the lowering of the viscosity of said semisolidified manganese nitrate solution.

Thus, the invention described herein makes possible the objectives of: (1) providing a method that readily permits the formation of an electrolyte layer, made of manganese dioxide or other suitable materials and having predetermined uniform thickness, upon the surface of the electrode of a solid electrolytic capacitor, and (2) providing a method for forming such an electrolyte layer with the desired thickness by a smaller number of repetitions of the manganese nitrate pyrolysis process, as compared with conventional methods.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

An electrode employed in the present invention is formed by a porous body made of a valve metal to which an anode lead made of the same type of valve metal is electrically connected. The applicable valve metals include tantalum, aluminum and titanium.

The electrolyte powders which can be used for the purposes of the present invention include powdered metallic oxides such as manganese dioxide, manganese hydroxide, lead monoxide and lead dioxide powders, etc. The grain diameters of these electrolyte powders should preferably be in the range of 1 to 50 $\mu$m. If the grain size is smaller than 1 $\mu$m, then, after the impregnation of the electrode with the manganese nitrate solution and the application of the electrolyte powder, the coating of electrolyte powder is prone to be pressed upward by the steam and nitrogen oxide gas which are generated in the process of pyrolyzing the manganese nitrate, and consequently a uniform electrolyte layer cannot be formed on the surface of the electrode. On the other hand, if the grain diameter of the powder exceeds 50 $\mu$m, then the granules become unduly heavy, and therefore uniform adhesion of the powder to the electrode surface is difficult to achieve.

According to the method of the present invention, an electrolyte layer in solid electrolytic capacitors is formed, for example, as follows.

First, a positive voltage is impressed upon the aforementioned electrode to form a dielectric oxide film on the surface.

Since the oxide film on the electrode surface is an insulator, the electrolyte powder does not readily adhere to the surface in the subsequent process. Therefore, the presence of a small amount of electrically conductive manganese dioxide on the surface of the oxide film is desirable. In order to achieve this, the electrode with an oxide film is immersed in a manganese nitrate solution of specific gravity 1.10 to 1.50 and the said manganese nitrate is pyrolyzed; this operation being performed at least once. When the surface of the electrode has been appropriately covered with manganese dioxide by this operation, the electrode surface assumes a dark gray color. The conditions for the electrode surface to assume this dark gray color depend upon the material, size and pore density of the electrode, as well as the thickness of the oxide film, etc. Accordingly, the conditions such as the appropriate concentration of the manganese nitrate solution and the number of repetitions of the thermal treatment should be determined while observing the appearance of the electrode.

Next, this electrode is immersed in a manganese nitrate solution of specific gravity 1.30 to 2.00, thereby impregnating the manganese nitrate solution into the voids of the porous material that composes the electrode. When this operation is performed, if the amount of adhering manganese nitrate solution is unduly large, then, in the pyrolytic process to be described below, the electrolyte powder adhering to the electrode surface is pressed up from the surface by the steam and nitrogen oxide gas, and consequently irregularities arise in the electrolyte layer. Therefore, excess manganese nitrate solution adhering at the present stage should preferably be removed by air blowing or other suitable means.

It is recommended that this electrode impregnated with manganese nitrate solution be heated in the range of 120° C. to 180° C. so that at least a portion of the manganese nitrate is pyrolyzed. According to this heat treatment, the manganese nitrate solution is converted into a viscous semisolidified material. Because of the viscosity of the semisolidified manganese nitrate solution, the deposition of electrolyte powder on the said electrode, which will be described later, is performed advantageously. If this electrode is allowed to stand at least 10 seconds at room temperature, then the moisture of air is absorbed by the semisolidified manganese nitrate solution, causing the lowering of the viscosity of the semisolidified solution. When this electrode is used, the deposition of the electrolyte powder is performed more preferably.

A suitable electrostatic deposition apparatus is used to deposit electrolyte powder particles on the surface of the electrode which has been impregnated with manganese nitrate solution in the above manner. For example, this deposition of electrolyte particles onto the electrode surface can be effected by using the electrostatic deposition apparatus shown in FIG. 2. Electrodes 4 which have been impregnated with manganese nitrate solution are connected by anode leads 6 with a stainless steel plate 7 and then set into the deposition chamber 1. An electrolyte powder 8 is placed on a porous plate 9, and when air compressed by a compressor 11 is introduced into the deposition chamber 1 through the said porous plate 9, the electrolyte powder 8 overlaying the porous plate 9 is dispersed through the deposition chamber 1. Simultaneously, a voltage is impressed upon the electrostatic charging electrodes 10 by a high-voltage source 3, thus creating a corona discharge at the tips of the electrodes 10. The electrolyte powder particles are negatively charged by this corona discharge, hence, the powder particles repel each other electrically and are therefore distributed through the deposition chamber in an excellent state of dispersion. When the electrolyte powder particles which have been negatively charged in the vicinity of the tips of the charging electrodes 10 approach the surfaces of the grounded electrodes 4, the particles adhere to the electrodes 4, thereby forming an electrolyte powder layer of uniform thickness. This method permits the uniform deposition of electrolyte powder particles even on the corners of the electrodes, so that an overall uniform layer of powder particles can be obtained.

Figure 2:
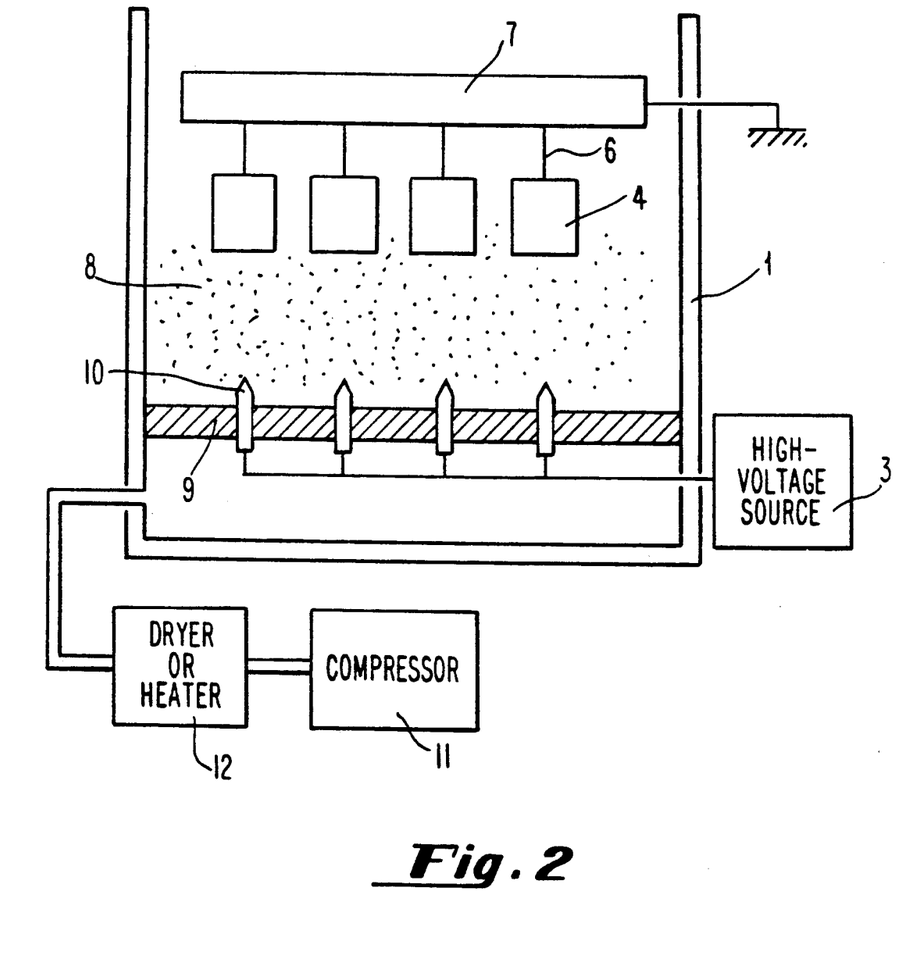
FIG. 2 is a schematic view of the electrostatic deposition apparatus used to coat the electrode with the electrolyte powder in another example of the present invention.

When the electrolyte powder particles are charged in this manner, a voltage of at least 10 kV should be imposed in order to charge the electrolyte powder effectively.

Furthermore, in the aforementioned electrostatic depositon apparatus, the temperature of the air conveyed into the deposition chamber in order to agitate the electrolyte powder particles should preferably be at least 20° C. and the moisture content of this air should not exceed 4% by volume. If the injected air does not satisfy the aforementioned conditions, then the electrolyte powder particles cohere and form aggregates, so that a uniform layer of electrolyte powder is difficult to form on the electrode surface.

Figure 1:
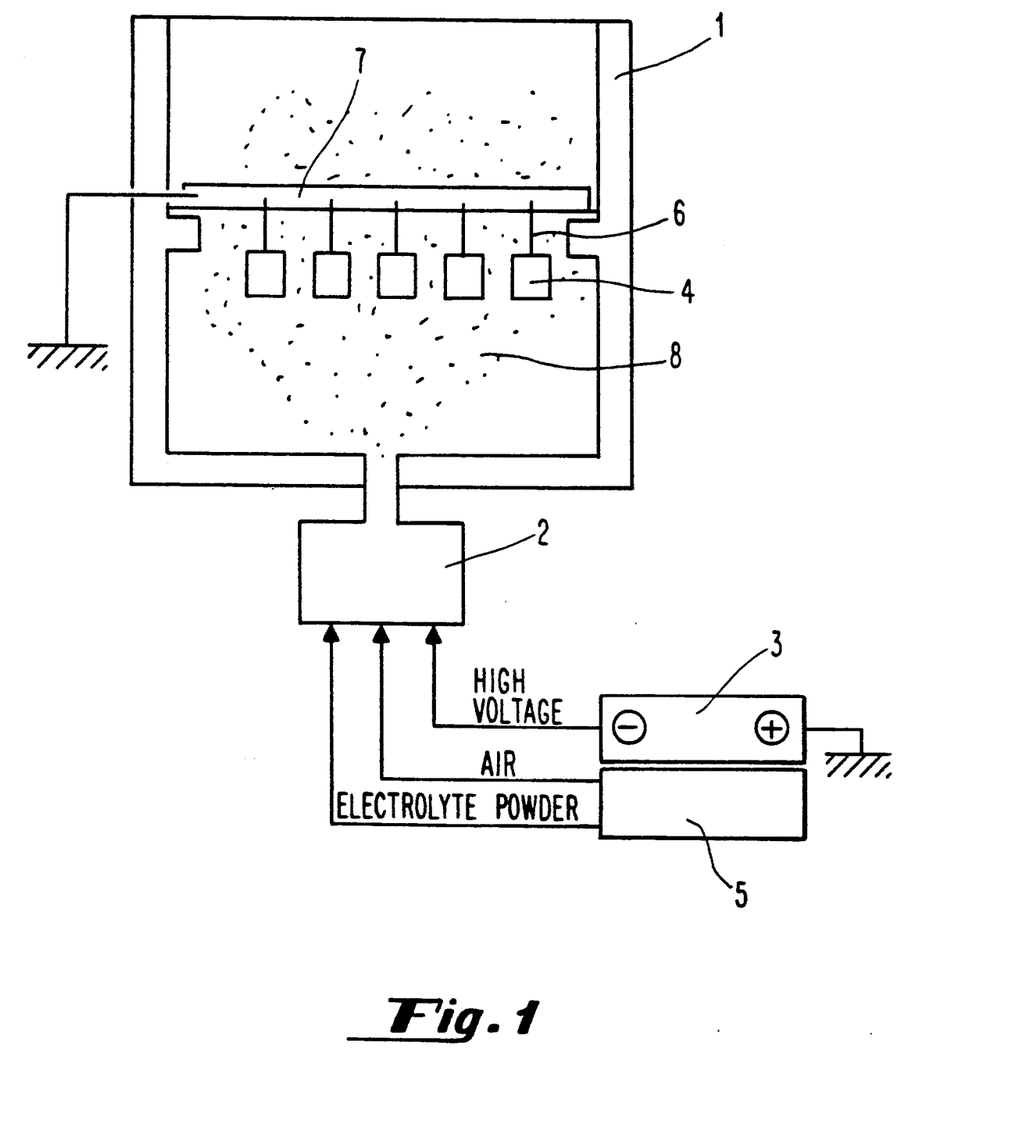
FIG. 1 is a schematic view of the electrostatic deposition apparatus used to coat the electrode with the electrolyte powder in one example of the present invention.

The electrostatic deposition apparatus shown in FIG. 2 is constructed so that the electrolyte powder placed on the porous plate is agitated by injected air. Alternatively, however, the electrolyte powder can also be directly injected into the deposition chamber together with compressed air from an electrolyte powder receptacle equipped with a compressor as shown in FIG. 1. Moreover, in the electrostatic deposition apparatus shown by FIG. 2, the tips of the charging electrodes protrude above the porous plate, however, the tips of the charging electrodes could also be located within or below the porous plate.

The electrodes upon which electrolyte powder has been deposited in the aforementioned manner are heated, thereby pyrolyzing the manganese nitrate previously impregnated into the electrodes and forming the desired electrolyte layer.

Next, as shown in FIG. 4, a dielectric carbon layer 43 and a conductive cathode layer 44 composed of a silver coating or other suitable material are successively formed on the electrodes upon which the electrolyte layer 42 has previously been formed. Then, positive terminal 61 and negative terminal 45 are connected to the anode lead 6 and cathode layer 44, respectively, and finally these assemblies are covered with a suitable resin 47, thus obtaining the desired solid electrolytic capacitor 40.

The present invention readily permits the formation of a uniform electrolyte layer of predetermined thickness on the electrode surface. Moreover, the present method permits the formation of an electrolyte layer with the desired thickness by only a few repetitions of the impregnation and pyrolysis of manganese nitrate, thereby shortening the manufacturing process. Moreover, since the present method permits the formation of an electrolyte layer of the desired thickness even without the use of concentrated manganese nitrate solutions of high specific gravity, control of the concentrations of manganese nitrate solutions is simplified. As a consequence of these improvements, the proportion of defective articles is substantially reduced when solid electrolytic capacitors are produced by the method of the present invention. Furthermore, solid electrolytic capacitors produced by the method of the present invention are not subject to quality variations as regards voltage withstanding characteristics, possess excellent moisture-resistance properties and can be used for long periods of time at high temperatures.

EXAMPLES

The method of the present invention will be explained in further detail with reference to specific examples.

EXAMPLE 1

The electrode used in the present example is a porous body made of tantalum (i.e., one of the valve metals) 4.0 mm in length, 3.0 mm in width and 1.4 mm in thickness, and an anode lead composed of tantalum was connected. This electrode with anode lead was oxidized by an ordinary anodization method, thereby forming a dielectric oxide film on the surfaces of the electrode and the anode lead. The anodization was performed as follows. First, the anode lead 6 was connected with the stainless steel plate 7, then this stainless steel plate was placed inside a formation chamber, and a voltage of 115 V was impressed upon the stainless steel plate 7 to form a dielectric oxide film on the electrode surface.

The electrode with the dielectric oxide film formed in the aforementioned manner was immersed in a manganese nitrate solution of specific gravity 1.20, thereby impregnating the manganese nitrate solution into the voids of the porous body. This electrode was then heated for 5 minutes at 250° C. in an electric furnace to pyrolyze the manganese nitrate. This process was performed twice, thus filling the voids of the porous body with manganese nitrate. Next, this electrode was immersed in a manganese nitrate solution of specific gravity 1.40, and after lifting the electrode out of the bath, the manganese nitrate solution protruding on the surface of the electrode due to surface tension was removed by an air blower.

Using the electrostatic deposition apparatus shown in FIG. 1, the electrolyte powder particles were then deposited onto the electrode which had been impregnated with manganese nitrate solution in the aforementioned manner. This electrostatic deposition apparatus is equipped with an electrostatic air spray gun 2 below the deposition chamber 1, while a DC high-voltage source 3 is connected to the electrostatic air spray gun 2. The DC high-voltage source 3 is capable of impressing a DC voltage of 50–150 kV between the deposition chamber 1 and the electrostatic air spray gun 2. Furthermore, an electrolyte powder receptacle 5 equipped with a compressor which can inject electrolyte powder by means of an air stream is connected with the air spray gun 2. The deposition chamber 1 is constructed so that a stainless steel plate 7 connected with the electrodes 4 can be fixed inside the chamber. The electrodes 4 which have previously been impregnated with manganese nitrate solution in the aforementioned manner were then connected to the stainless steel plate 7 and set in the deposition chamber 1. A 70 kV voltage was impressed by means of the DC high-voltage source 3, thus creating a corona discharge within the deposition chamber 1. Simultaneously, γ-manganese dioxide powder with grain sizes of 5–10 μm were blown from the receptacle 5 into the deposition chamber 1 by the electrostatic air spray gun 2 at a pressure of 50 kg/cm² for a period of 2 seconds. The manganese dioxide powder injected into the deposition chamber 1 was negatively charged by the corona discharge, and the charged powder particles approaching the grounded electrodes 4 adhered to the electrode surfaces. As a result, a 50–70 μm-thick layer of γ-manganese dioxide powder particles was formed. By this method, particles of manganese dioxide powder can even be deposited on the upper surface of the electrode, and accordingly, a uniform layer of powder particles was obtained.

Next, the electrode with the layer of manganese dioxide powder particles formed in the manner described above was heated for 5 minutes at 250° C. in an electric furnace. By this heat treatment, the manganese nitrate was pyrolyzed, and the manganese dioxide produced by this pyrolysis adhered the manganese dioxide powder previously deposited on the surface of the electrode to the surface of the electrode, and bound the manganese dioxide powder particles mutually that were previously deposited on the surface of the electrode. In the aforementioned process of deposition of manganese dioxide powder particles, manganese dioxide powder is deposited not only onto the surface of the porous body of the electrode but also onto the stainless steel plate and the anode lead. However, the stainless steel plate and anode lead, which had not been immersed in the manganese nitrate solution, were readily cleaned by merely applying water after the heat treatment. Alternatively, this redundant powder can readily be removed by means of an air blower.

The aforementioned electrode was then immersed in a manganese nitrate solution of specific gravity 1.40, following which the electrode was heated for 5 minutes at 250° C. in an electric furnace to pyrolyze the manganese nitrate. This process was performed twice, thereby forming the desired electrolyte layer composed of manganese dioxide powder particles.

Next, a carbon layer 43 and a conductive cathode layer 44 composed of a silver coating material were successively formed onto the electrode on which the aforementioned electrolyte layer 42 had been formed. Then, the positive terminal 61 was connected to the anode lead 6, and the negative terminal 45 was connected to the cathode layer 44 by means of an electrically conductive adhesive 46. Finally this assembly was covered with a resin material 47, thereby obtaining a capacitor with rated voltage 35 V and rated capacitance 6.8 μF.

The capacitors produced according to the above-mentioned method were evaluated with respect to the proportion of defective articles, withstand voltage, short-circuit faults at high temperatures and short-circuit faults at high humidities. The conditions for evaluation of short-circuit faults were as follows.

Short-circuit faults at high temperatures: incidence of short-circuit faults during the application of the rated voltage for a prescribed time at 125° C.

Short-circuit faults at high humidities: incidence of short-circuit faults after being left standing under no load at 85° C. and relative humidity of 95% for 1000 hours.

The results of these tests are shown in Tables 1 and 2 together with the corresponding characteristics for capacitors produced by forming the electrolyte layer in accordance with the first method described in the preceding section "Description of the prior art".

TABLE 1

|  | Defective articles (%) | Withstand voltage (V) |
| --- | --- | --- |
| Conventional method | 6.0 | 68–82 |
| Example 1 | 1.0 | 91–94 |

TABLE 2

|  | Short-circuit faults | |
| --- | --- | --- |
|  | High-temperature test (125° C., 1000 hrs) | High-humidity test (85° C., 95% RH 1000 hrs) |
| Conventional method | 6/100 | 15/100 |
| Example 1 | 0/100 | 0/100 |

EXAMPLE 2

Using an electrode with the same basic structure as in Example 1, a dielectric oxide film was first formed on the electrode surface by the conventional anodization method. The anodization was performed as follows. First the anode lead 6 of the aforementioned electrode was connected with the stainless steel plate 7, then this stainless steel plate was placed within a formation chamber, and a voltage of 115 V was impressed upon the stainless steel plate, thereby forming a dielectric oxide film on the surface of the electrode.

The electrode upon which the aforementioned dielectric oxide film had been formed was immersed in a manganese nitrate solution of specific gravity 1.30, thus impregnating the voids of the porous body with the said manganese nitrate solution. This electrode was then heated for 5 minutes at 250° C. in an electric furnace, thereby pyrolyzing the manganese nitrate. This process was performed three times, thus filling the voids of the porous body with manganese dioxide. Next, this electrode was immersed in a manganese nitrate solution of specific gravity 1.40 and then lifted from the bath.

Using the electrostatic deposition apparatus shown in FIG. 2, electrolyte powder particles were then deposited upon the electrode which had been impregnated with manganese nitrate solution in the aforementioned manner. In this electrostatic deposition apparatus, a porous plate 9 is placed at the lower part of the interior of the deposition chamber 1, and a plurality of electrostatic charging electrodes 10 are installed in the porous plate 9 so that the tips of the charging electrodes protrude above the porous plate 9. An electrolyte powder 8 is uniformly loaded upon the porous plate 9. The aforementioned electrostatic charging electrodes 10 are connected with a high-voltage source 3, providing for the application of a high DC voltage to the said electrodes. A compressor 11 which can inject air from below the porous plate 9 is connected with the aforementioned deposition chamber 1, while a dryer or heater 12 for drying this air is interposed between the deposition chamber 1, and the compressor 11. The deposition chamber 1 is so constructed that a stainless steel plate 7 with attached electrodes 4 can be fixed within the chamber. The electrodes which had been impregnated with manganese nitrate in the aforementioned manner were attached to the stainless steel plate 7 and set into the deposition chamber 1. Manganese dioxide powder of the same type as that used in Example 1 was loaded onto the porous plate 9, and air compressed by the compressor 11 was blown into the deposition chamber 1 after being dried en route by the air dryer or heater 12, thereby dispersing the manganese dioxide powder from the upper surface of the porous plate into the cavity of the deposition chamber 1. Simultaneously, a DC voltage of 70 kV was impressed upon the electrostatic charging electrodes 10 by the high-voltage source 3, producing a corona discharge from the tips of the charging electrodes. This discharge imparted a negative charge to the manganese dioxide powder, hence the powder particles became mutually repellent and were therefore distributed throughout the cavity of the deposition chamber 1 in an excellent state of dispersion. When the negatively charged manganese dioxide powder particles approached the surfaces of the grounded electrodes 4, the particles adhered to the electrodes and a uniform layer of manganese dioxide powder particles, with thickness 50–70 μm, was formed on the electrode surfaces. By this method, manganese dioxide powder particles can be uniformly deposited even on the upper surface of the electrodes, and consequently, a highly uniform layer of powder particles was obtained.

The electrodes upon which a layer of manganese dioxide powder particles had been formed were then subjected to heat treatment, thereby securing intimate adhesion of the manganese dioxide powder to the electrode surfaces and mutual bonding of the manganese dioxide powder particles by means of manganese dioxide produced by pyrolysis in the same manner as in Example 1 above.

The aforementioned electrodes were then immersed in a manganese nitrate solution of specific gravity 1.75, following which the electrodes were heated for 5 minutes at 250° C. in an electric furnace to pyrolyze the manganese nitrate. This process was performed twice, thereby forming the desired electrolyte layer composed of manganese dioxide powder particles.

Using the electrodes upon which an electrolyte layer had been formed by the aforementioned process, the same procedure as that used in Example 1 was applied, thereby obtaining a capacitor with rated voltage 35 V and rated capacitance 6.8 μF.

The characteristics of the capacitors produced according to the above-mentioned method are shown in Tables 3 and 4, together with the corresponding characteristics for capacitors produced by forming the electrolyte layer in accordance with the second method described in the preceding section "Description of the prior art".

TABLE 3

|  | Defective articles (%) | Withstand voltage (V) |
|---|---|---|
| Conventional method | 2.8 | 65–80 |
| Example 2 | 0.2 | 80–90 |

TABLE 4

|  | Short-circuit faults | |
|---|---|---|
|  | High-temperature test (125° C., 2000 hrs) | High-humidity test (85° C., 95% RH 1000 hrs) |
| Conventional method | 3/1000 | 5/1000 |
| Example 2 | 0/1000 | 0/1000 |

EXAMPLE 3

Using an electrode with the same basic structure as in Example 1, a dielectric oxide film was first formed on the electrode surface by the conventional anodization method. The anodization was performed as follows. First, the anode lead 6 of the aforementioned electrode was connected with the stainless steel plate 7, then this stainless steel plate was placed within a formation chamber, and a voltage of 115 V was impressed upon the stainless steel plate, thereby forming a dielectric oxide film on the surface of the electrode.

The electrode upon which the aforementioned dielectric oxide film had been formed was then subjected to the same operations as in Example 2, thereby filling the voids of the porous body with manganese dioxide. Next, this electrode was immersed in a manganese nitrate solution of specific gravity 1.40 and then lifted from the bath, after which the manganese nitrate solution protruding on the surface of the electrode due to surface tension was removed by an air blower.

Figure 3:
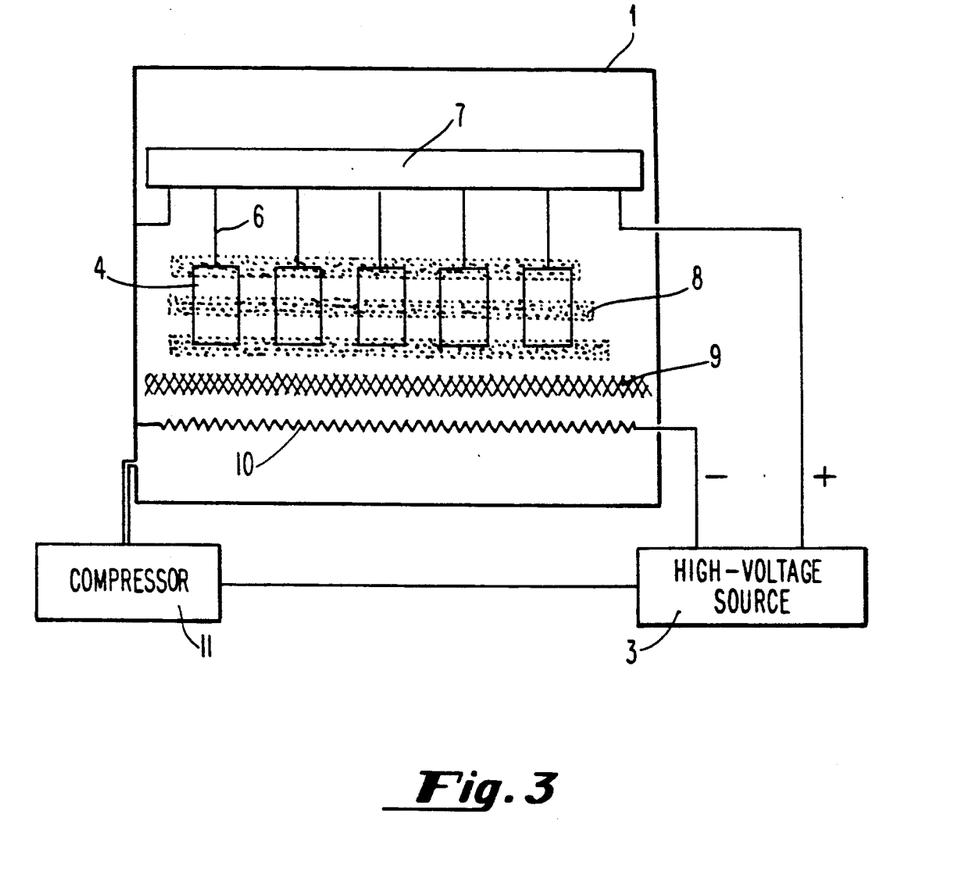
FIG. 3 is a schematic view of the electrostatic deposition apparatus used to coat the electrode with the electrolyte powder in still another example of the present invention.

Again using the electrostatic deposition apparatus shown in FIG. 3, the electrolyte powder particles were then deposited onto the aforementioned electrode which had been immersed in the manganese nitrate solution. This electrostatic deposition apparatus is equipped with electrostatic charging electrodes 10 at the lower part of the deposition chamber 1, while a porous plate 9 is installed in the deposition chamber 1 at a suitable distance above the charging electrodes 10. Electrolyte powder 8 is uniformly spread over the said porous plate 9. The aforementioned charging electrodes 10 are connected with a high-voltage source 3, so that a high DC voltage can be impressed upon these charging electrodes. Furthermore, a compressor 11 is connected with the deposition chamber 1, so that air can be blown into the chamber from below the porous plate 9. The deposition chamber 1 is constructed so that a stainless steel plate 7 connected with electrodes 4 can be fixed inside the chamber 1. The electrodes which had been impregnated with manganese nitrate in the aforementioned manner were attached to the stainless steel plate 7 and set into the deposition chamber 1. Manganese dioxide powder of the same type as that used in Example 1 was placed onto the porous plate 9, and air compressed by the compressor 11 was blown into the deposition chamber 1, thereby dispersing the manganese dioxide powder from the upper surface of the porous plate into the cavity of the deposition chamber 1. Simultaneously, a DC voltage of 70 kV was impressed upon the electrostatic charging electrodes 10 by the high-voltage source 3, producing a corona discharge. As a result, a uniform layer of manganese dioxide powder particles, with thickness of 50–70 μm, was formed on the electrode surfaces. By this method, as in Examples 1 and 2 above, manganese dioxide powder particles can be uniformly deposited even on the upper surface of the electrodes, and consequently a highly uniform layer of electrolyte powder particles was obtained.

The electrodes upon which a layer of manganese dioxide powder particles had been formed by this method were then subjected to heat treatment, thereby securing intimate adhesion of the manganese dioxide powder to the electrode surfaces and mutual bonding of the manganese dioxide powder particles by means of manganese dioxide produced by pyrolysis in the same manner as in Example 1. The electrodes were then immersed in a manganese nitrate solution of the same concentration as that used in the corresponding step in Example 1, and this immersion and pyrolysis operations were performed as in Example 1, thereby forming the desired manganese dioxide electrolyte layer.

Using the electrodes upon which an electrolyte layer had been formed by the aforementioned process, a capacitor with rated voltage 35 V and rated capacitance 6.8 $\mu$F was obtained by the same procedure as in Example 1.

The characteristics of the capacitor produced according to the above-mentioned method are shown in Tables 5 and 6, together with the corresponding characteristics for the capacitors produced by forming the electrolyte layer in accordance with the second method described in the preceding section "Description of the prior art".

TABLE 5

|  | Defective articles (%) | Withstand voltage (V) |
| --- | --- | --- |
| Conventional method | 2.8 | 65-80 |
| Example 3 | 0.2 | 80-90 |

TABLE 6

|  | Short-circuit faults | |
| --- | --- | --- |
|  | High-temperature test (125° C., 2000 hrs) | High-humidity test (85° C., 95% RH 1000 hrs) |
| Conventional method | 3/1000 | 5/1000 |
| Example 3 | 0/1000 | 0/1000 |

EXAMPLE 4

Using an electrode with the same type of basic structure as that employed in Example 1, a dielectric oxide layer was formed on the surface of the electrode by the same procedure as in Example 3. Next, the voids of the porous body of the electrode were filled with manganese dioxide by the same procedure as that used in the corresponding operation in Example 1.

This electrode was then immersed in a manganese nitrate solution of specific gravity 1.60, then lifted from the solution and heated at 150° C. for 10 minutes, thus removing water, simultaneously pyrolyzing a portion of the manganese nitrate, and thereby converting the impregnated solution to a viscous semisolidified material. Then the electrode was allowed to stand at room temperature for a period of at least several tens of seconds.

Then, using the apparatus shown in FIG. 3, electrolyte powder particles were deposited upon the aforementioned electrode in the same manner as in Example 3, thereby forming a uniform layer of manganese dioxide powder particles 50-70 $\mu$m in thickness upon the surface of the electrode. Even when protuberances appeared on the surface of the semisolid manganese nitrate layer, these protuberances were blown away by the compressed air injected by the compressor, hence, an electrode with a manganese dioxide layer formed on a smooth surface was obtained. The excess manganese dioxide particles clinging to the electrode surface were then removed by applying suitable vibrations to the electrode. Owing to the powerful adhesive strength of the semisolidified manganese nitrate solution, the manganese dioxide powder intimately adhering to this manganese nitrate material is not removed even by a certain amount of vibration.

The electrodes upon which a layer of manganese dioxide powder particles had been formed by this method were then subjected to heat treatment, thereby securing intimate adhesion of the manganese dioxide powder to the electrode surfaces and mutual bonding of the manganese dioxide powder particles by means of manganese dioxide produced by pyrolysis in the same manner as in Example 1. Then, using a manganese nitrate solution of the same concentration as that used in the corresponding steps of Example 1, immersion and pyrolysis operations were also performed as in Example 1, thereby forming the desired manganese dioxide electrolyte layer.

Using the electrodes upon which an electrolyte layer had been formed by the aforementioned process, a capacitor element with rated voltage 35 V and rated capacitance 6.8 $\mu$F was obtained by the same procedure as in Example 1.

The characteristics of the capacitors produced according to the above-mentioned method are shown in Tables 7 and 8, together with the corresponding characteristics for the capacitor produced by forming the electrolyte layer in accordance with the third method described in the preceding section "Description of the prior art".

TABLE 7

|  | Defective articles (%) | Withstand voltage (V) |
| --- | --- | --- |
| Conventional method | 4.2 | 40-71 |
| Example 4 | 0.82 | 56-80 |

TABLE 8

|  | Short-circuit faults | |
| --- | --- | --- |
|  | High-temperature test (125° C., 2000 hrs) | High-humidity test (85° C., 95% RH 1000 hrs) |
| Conventional method | 5/100 | 31/100 |
| Example 4 | 1/100 | 3/96 |

The data presented in Tables 1-8 demonstrate that, as compared with capacitors produced by the previous methods, the capacitors with electrolyte layers formed by the method of the present invention have a lower proportion of defective articles and display little variation in withstand voltage, and, moreover, display a lower incidence of short-circuit faults in high-temperature tests or under high-humidity conditions.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for the formation of an electrolyte layer of solid electrolytic capacitors, comprising the steps of:
   (1) forming an oxide film with dielectric properties on the surface of a porous electrode made of a valve metal, said electrode being electrically connected to an anode lead made of a valve metal,
   (2) impregnating said electrode, on which said oxide film has been formed, with a manganese nitrate solution, and pyrolyzing said manganese nitrate to manganese dioxide, repeated at least once, whereby the voids of the porous electrode are filled with manganese dioxide,
   (3) impregnating said electrode, on which said oxide film has been formed, with a solution of manganese nitrate,
   (4) electrostatically charging metallic oxide electrolyte powder particles,
   (5) electrostatically depositing said electrolyte powder particles on the surface of said electrode which has been impregnated with said solution,
   (6) pyrolyzing said manganese nitrate to manganese dioxide, and
   (7) impregnating said electrode with a manganese nitrate solution followed by a step of pyrolyzing said manganese nitrate, repeated at least once to form an electrolyte layer on the surface of said oxide film.

2. A method according to claim 1, wherein said step 5 of claim 1 is performed by placing said electrode in an atmosphere in which said electrolyte powder is being dispersed.

3. A method according to claim 2, wherein said electrolyte powder is dispersed by injecting air from below a porous plate on which said electrolyte powder is placed into a space above said plate.

4. A method according to claim 2, wherein said electrolyte powder is charged by electrostatic charging-electrodes, the tips of which are located above, within or below said porous plate.

5. A method according to claim 4, wherein the voltage impressed on said electrostatic charging electrodes is at least 10 kV.

6. A method according to claim 3, wherein the temperature of said air is at least 20° C.

7. A method according to claim 3, wherein the moisture content of said air is 4% by volume or less.

8. A method according to claim 1, wherein said electrolyte powder is selected from the group consisting of manganese dioxide powder, manganese hydroxide powder, lead monoxide powder and lead dioxide powder.

9. A method for the formation of an electrolyte layer of solid electrolytic capacitors, comprising the steps of:
   (1) forming an oxide film with dielectric properties on the surface of a porous electrode made of a valve metal, said electrode being electrically connected to an anode lead made of a valve metal,
   (2) impregnating said electrode, on which said oxide film has been formed, with a solution of manganese nitrate,
   (3) heating said electrode at a temperature in the range of 120° C. to 180° C., so that at least a portion of said manganese nitrate is pyrolyzed, and said manganese nitrate solution is converted into a viscous semisolidified material,
   (4) electrostatically charging metallic oxide electrolyte powder particles,
   (5) electrostatically depositing said electrolyte powder particles on the surface of said electrode which has been impregnated with said manganese nitrate solution, and
   (6) pyrolyzing said manganese nitrate to manganese dioxide to form an electrolyte layer on the surface of said oxide film.

10. A method according to claim 9, wherein said electrolyte powder is selected from the group consisting of manganese dioxide powder, manganese hydroxide powder, lead monoxide powder and lead dioxide powder.

11. A method for the formation of an electrolyte layer of solid electrolytic capacitors, comprising the steps of:
   (1) forming an oxide film with dielectric properties on the surface of a porous electrode made of a valve metal, said electrode being electrically connected to an anode lead made of a valve metal,
   (2) impregnating said electrode, on which said oxide film has been formed, with a solution of manganese nitrate,
   (3) heating said electrode at a temperature in the range of 120° C. to 180° C., so that at least a portion of said manganese nitrate is pyrolyzed, and said manganese nitrate solution is converted into a viscous semisolidified material,
   (4) allowing said electrode to stand at least 10 seconds at room temperature, so that the moisture of air is absorbed by said semisolidified manganese nitrate solution, causing the lowering of the viscosity of said semisolidified manganese nitrate solution,
   (5) electrostatically charging metallic oxide electrolyte powder particles,
   (6) electrostatically depositing said electrolyte powder particles on the surface of said electrode which has been impregnated with said manganese nitrate solution, and
   (7) pyrolyzing said manganese nitrate to manganese dioxide to form an electrolyte layer on the surface of said oxide film.

12. A method according to claim 11, wherein said electrolyte power is selected from the group consisting of manganese dioxide powder, manganese hydroxide powder, lead monoxide powder and lead dioxide powder.

* * * * *